United States Patent
Fine et al.

(10) Patent No.: US 7,720,759 B2
(45) Date of Patent: May 18, 2010

(54) REVENUE ASSURANCE TOOL

(75) Inventors: Jack Fine, Benicia, CA (US); Elizabeth Deshong, San Ramon, CA (US); Marie Jennifer Lim, San Ramon, CA (US); Ailene Kim, Livermore, CA (US); Euly LeGro, Benicia, CA (US); Senthil Kumar, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/756,184

(22) Filed: May 31, 2007

(65) Prior Publication Data

US 2008/0301018 A1      Dec. 4, 2008

(51) Int. Cl.
*G06Q 40/00*   (2006.01)
*H04M 11/00*   (2006.01)
(52) U.S. Cl. .......................................... 705/40; 455/405
(58) Field of Classification Search ............... 705/35–42
See application file for complete search history.

(56) References Cited

U.S. PATENT DOCUMENTS

| | | | | |
|---|---|---|---|---|
| 6,047,051 | A  * | 4/2000  | Ginzboorg et al. | 379/130 |
| 6,577,858 | B1 * | 6/2003  | Gell | 455/407 |
| 6,636,504 | B1 * | 10/2003 | Albers et al. | 370/352 |
| 6,639,975 | B1 * | 10/2003 | O'Neal et al. | 379/112.01 |
| 6,988,224 | B2 * | 1/2006  | Robison et al. | 714/47 |
| 2002/0114435 | A1 * | 8/2002 | Lawyer et al. | 379/114.14 |
| 2003/0046421 | A1 * | 3/2003 | Horvitz et al. | 709/238 |
| 2004/0015497 | A1   | 1/2004 | Swarna et al. | |
| 2004/0058668 | A1 * | 3/2004 | Russell et al. | 455/406 |
| 2004/0133488 | A1 * | 7/2004 | Daidone et al. | 705/34 |
| 2006/0190473 | A1 * | 8/2006 | Ovsyannikov et al. | 707/102 |

OTHER PUBLICATIONS

"ETI Serves Up Billing/OSS Capabilities for Iowa City", Productivity Software. Boston: May 1, 2007. vol. 20 Iss 5.*
"Eti Serves up Billing/OSS capabilities for Iowa City".*
Davies, Jennifer. "Phone-bill sleuths finding hang-ups for their clients | Outsource companies like Profitline making most of industry inefficiencies", The San Diego Union- Tribune. San Diego, Calif. Apr. 20, 2004. p. C.1.*

(Continued)

*Primary Examiner*—Hani Kazimi
*Assistant Examiner*—Mohammad Z Shaikh
(74) *Attorney, Agent, or Firm*—Greenblum & Bernstein, P.L.C.

(57) ABSTRACT

A system assures revenue reconciliation of customer billing and vendor settlements for multimedia services, including voice over IP, provided through a network. The system includes a data repository configured to store a plurality of tables, each table including data collected from a plurality of network elements in the network and relating to at least one of customer usage, mediation, customer billing and vendor settlement. The system also includes a processor configured to execute an alert rule based on data retrieved from at least one table stored in the data repository. The alert rule includes a comparison between the at least one table and at least one other table of the plurality of tables. The processor triggers an alert associated with the alert rule when a corresponding alert rule threshold is exceeded based on the comparison, and initiates reporting of the triggered alert.

18 Claims, 8 Drawing Sheets

OTHER PUBLICATIONS

"Mexican Cellco Isuacell orders Ectel Integrated Fraud Prevention and Revenue Assurance Solution", PR Newswire. New York: Sep. 13, 2004. p. 1.*

ESI Announces a New Suite of Applications for the Telecommunications Industry: Reveneu ERA- For Revenue Expansion, Revenue Retention and Revenue Assurance Solutions. Business Wire, New York: Mar. 1, 2001. p. 1.*

"Four International Banks select MTS Applications Suite to Manage Telecommunications Expenses and Improve Efficiency" PR Newswire, Dec. 1, 2005, pp. 1-3.*

"North American Telco Operators Trim Revenue Losses; Losses Decline but Fraud Remains a Growing Problem", PR Newswire. New York: Sep. 6, 2006.*

* cited by examiner

Alert Rule Setup

410  Database: LS REVA ODR
412  Alert Rule:
414  Alert Rule Description:

416  Alert Group:
- AlfredOnly
- Ann Only
- Jane Group
- jenjane
- Jennifer

418  Delay Execution Time:
420  File Seq # Ind:
422  Timing: Select Timing
424  Threshold Exemption Check:

426  Control Point:
- Raw
- XACCT
- Enabler A&F
- Enabler Rater
- APM

428  Effective Date: 03/19/2007    ex: mm/dd/yyyy - 04/23/2003

ALERT RULE SETUP

| TABLE/VIEW | [NEG] | ENTER COLUMN NAME | ENTER COLUMN NAME |
|---|---|---|---|
| DW_LS_REVA_IPTV_RAW | | CHARGE | COUNT_OF_IPTVS ▶ |
| DW_LS_REVA_XACT_IPTV_BILL | ⌐ | CHARGE | COUNT_OF_IPTVS ▶ |
| DW_LS_REVA_XACT_IPTV_DUP | ⌐ | CHARGE | COUNT_OF_IPTVS ▶ |
| DW_LS_REVA_XACT_IPTV_ERR | ⌐ | CHARGE | COUNT_OF_IPTVS ▶ |
| VARIANCE TYPE | | SELECT VARIANCE TYPE ▶ | SELECT VARIANCE TYPE ▶ |
| ALERT TYPE | | SELECT ALERT TYPE ▶ | SELECT ALERT TYPE ▶ |
| GENERATE WARNING | | ☑ | ⌐ ✕ |

[BACK] [NEXT] [CANCEL]

FIG. 6

ALERT RULE SETUP 714

ALERT KEY LEVEL: 1   710

| TABLE | FILE ID | KEY 1 |
|---|---|---|
| DW_LS_REVA_IPTV_RAW | REVA IPTV RAW | ADULT_CONTENT |
| DW_LS_REVA_XACT_IPTV_BILL | XACT IPTV BILL | ADULT_CONTENT |
| DW_LS_REVA_XACT_IPTV_DUP | XACT IPTV DUP | ADULT_CONTENT |
| DW_LS_REVA_XACT_IPTV_ERR | XACT IPTV ERR | ADULT_CONTENT |

708   712

[BACK] [SAVE] [SAVE & CREATE THRESHOLD] [CANCEL]

FIG. 7

ALERT THRESHOLD UPDATE

| | REQUIRED | | OPTIONAL |
|---|---|---|---|
| | LOW RANGE VALUE | HIGH RANGE VALUE | ALERT MINIMUM VALUE |
| 810 — HIGH: | 99.9 | 100.1 | |
| 812 — MEDIUM: | 99.95 | 100.05 | |
| 814 — LOW: | 99.99 | 100.01 | |

[SUBMIT] [RESET] [CANCEL]

FIG. 8

REVENUE ASSURANCE TOOL

BACKGROUND OF THE INVENTION

1. Field of the Disclosure

The present disclosure relates to revenue reconciliation for providing multimedia services. More particularly, the present disclosure relates to building alert rules and generating alerts to track whether billing for services and payments to vendors are consistent with the value of services provided.

2. Background Information

The recent trend has been for network providers to offer integrated access to different types of services, including Internet, telephone, video and data services. For example, traditional telephone service providers are offering high speed Internet access, Voice over IP (VoIP) and television programming over DSL connections, while cable television providers are offering high speed Internet access, VoIP and telephony services over conventional cable connections. The variety of services and corresponding media require significant demands on tracking and billing customers with respect to their usage, as well as settling with different vendors for the various products and services not directly supplied by the network provider. The task is further complicated by consolidating the information into a single bill.

Due to this complexity, network providers are at risk of losing track of the revenue, both owed and paid to them by their customers, and owed and paid by them to their vendors. The enormous amount and different types of data and services being tracked makes it difficult to readily and efficiently identify issues related to the network providers' revenue, such as revenue leakage, data anomalies and application defects. Network providers are therefore at risk of under-billing customers, while overpaying vendors, for the multimedia services.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

The present disclosure relates to a revenue assurance program, executable by a computer, that communicates with the various network elements of a multimedia service providing network. This tool provides end-to-end tracking and trending capabilities for revenue assurance and application controls. The process automatically collects data on usage events and products relating to customer billing, vendor settlements and other revenue related processes. When issues or anomalies are detected, notices may be sent to the user, e.g., via email, pager and/or posting to web page reports.

The revenue assurance tool focuses on the new IP-based products billing stream. A user configurable interface may be used for creating alert rules, as well as setting and maintaining thresholds, to enable the user to identify possible revenue leakage, data anomalies, application defects and the like. For example, loss of revenue may be prevented by identifying what would have been undetected dropped and/or unprocessed records.

This process addresses complex tracking and trending of multiple streams of data (e.g., IP data) per customer for accurate billing, and partner settlements. This tool ensures that all products are billed correctly, and that all products paid for by the network provider have been billed accurately to the customer. The rule components may be maintained in a configuration table of a data repository, thus eliminating the need for software changes. This process includes ad hoc reporting of billing events data, as well as alerts on possible billing issues. The benefits of this revenue assurance tool include reducing the cost of billing, reducing code reworking and reducing recovery costs of incorrect billing. Additionally, billing integrity will be increased by identifying possible misbillings, and alerting the user before the customers are misbilled. The time and cost of implementing new business rules for identifying billing anomalies may also be significantly reduced.

In view of the foregoing, the present disclosure, through one or more of its various aspects, embodiments and/or specific features or sub-components, is thus intended to bring out one or more of the advantages as specifically noted below.

An aspect of the present disclosure provides a system for reconciling revenue relating to customer billing and vendor settlements for multimedia services provided through a network. The system includes a data repository configured to store a plurality of tables, each table including data collected from a plurality of network elements in the network and relating to vendor settlement and at least one of customer usage, mediation and customer billing. The system further includes a processor configured to execute an alert rule based on data retrieved from at least one table of the plurality of tables stored in the data repository. The alert rule includes a comparison between the at least one table and at least one other table of the plurality of tables. The processor triggers an alert associated with the alert rule when a corresponding alert rule threshold is exceeded based on the comparison. The processor also initiates reporting of the triggered alert, which may include sending a notice identifying the alert rule. The notice may involve paging or sending an email to a service provider, or posting the notice in a web page report, accessible to the service provider.

The processor may also be configured to perform at least one of tracking or trending the data retrieved from at least one table of the plurality of tables stored in the data repository. Also, the alert rule threshold may be based on at least one rule component of the alert rule. The threshold may include a high level alert threshold, a medium level alert threshold and a low level alert threshold. The triggered alert may indicate, for example, that the customer billing does not match the vendor settlement.

Another aspect of the present disclosure provides a method of revenue reconciliation of customer billing and vendor settlements for multimedia services provided through a service network. The method includes creating an alert rule, including at least one rule component, and a threshold value corresponding to the alert rule. The method further includes performing at least one of tracking or trending data collected from at least one network element in the service network to obtain a set of data; applying the alert rule to the data set; and determining whether the threshold value has been exceeded based on application of the alert rule. An alert associated with the rule is triggered when the threshold value has been exceeded. The method also includes reporting when the alert has been triggered, indicating a possible revenue discrepancy. The revenue discrepancy may include, for example, at least one of a revenue leakage, a data anomaly, a system defect, or an input error.

Creating the alert rule may include interactively selecting the at least one rule component and the corresponding threshold value. The at least one rule component may be maintained in a configuration table to eliminate software changes. Also, the reporting of when the alert has been triggered may include sending a notice identifying the triggered alert. The notice may include, for example, paging or sending an email to a service provider, and/or posting the notice in a web page report, accessible to the service provider. The alert rule may include comparing raw pay per view usage data to billing and error data, and the threshold may include a difference in comparison of the raw pay per view usage data with the billing and error data of less than one percent. The threshold may include a high level alert threshold, a medium level alert threshold and/or a low level alert threshold.

Another aspect of the present disclosure provides a computer readable medium that stores a program, executable by a computer, for reconciling revenue relating to customer usage and billing for voice over IP services provided through a service network. The computer readable medium includes a creating code segment for enabling creation of an alert rule and a threshold value corresponding to the alert rule; an applying code segment for applying the alert rule to a data set; a determining code segment for determining whether the threshold value has been exceeded based on application of the alert rule, an alert associated with the alert rule being triggered when the threshold value has been exceeded; and a reporting code segment for causing a report to be generated when the alert has been triggered, indicating a possible revenue discrepancy. The alert rule includes at least one rule component, and the data set is obtained by performing at least one of tracking or trending data relating to the customer usage and billing collected from at least one network element in the service network. The alert rule may be created by interactive selection of the at least one rule component and the corresponding threshold value.

The various aspects and embodiments of the present disclosure are described in detail below.

Figure 1:
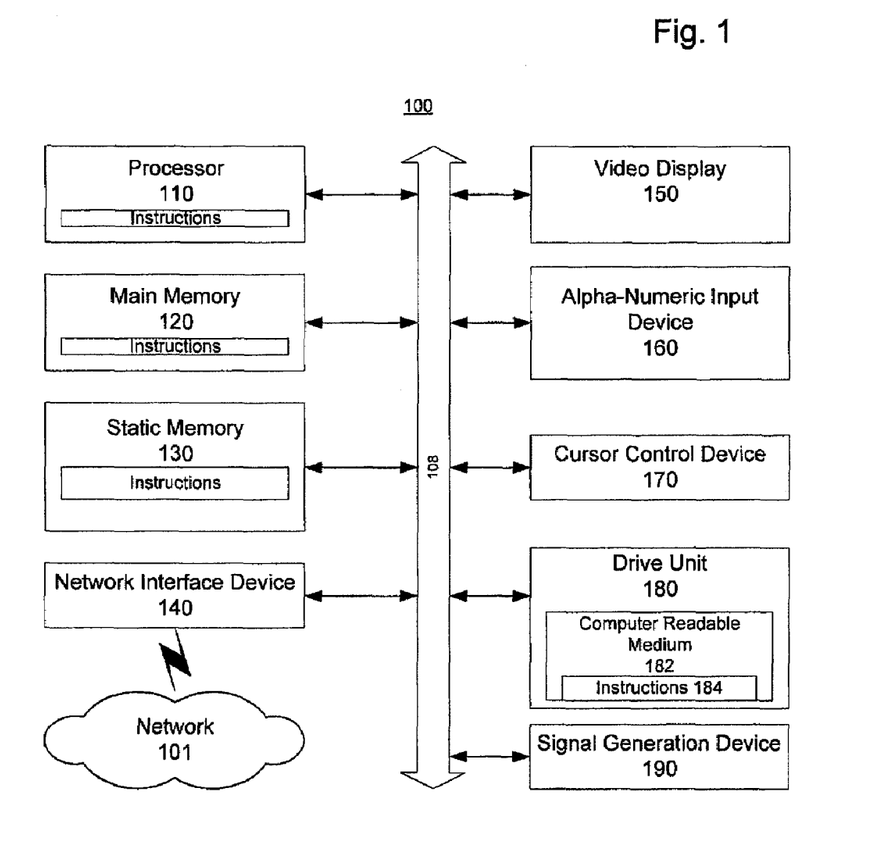
FIG. 1 shows an exemplary general computer system that includes a set of instructions for performing processing, according to an aspect of the present disclosure.

Referring to FIG. 1, a description is now provided of an illustrative embodiment of a general computer system 100, on which the automated revenue assurance process can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using a general computer system as shown in FIG. 1, a revenue assurance process may be provided. The system of FIG. 1 can also operate as various elements with the network, including an order management system (OMS), a customer relationship management (CRM) system, a service delivery platform (SDP), a server, a user platform, or the like, according to an aspect of the present disclosure, as indicated, for example, in FIG. 2.

Figure 2:
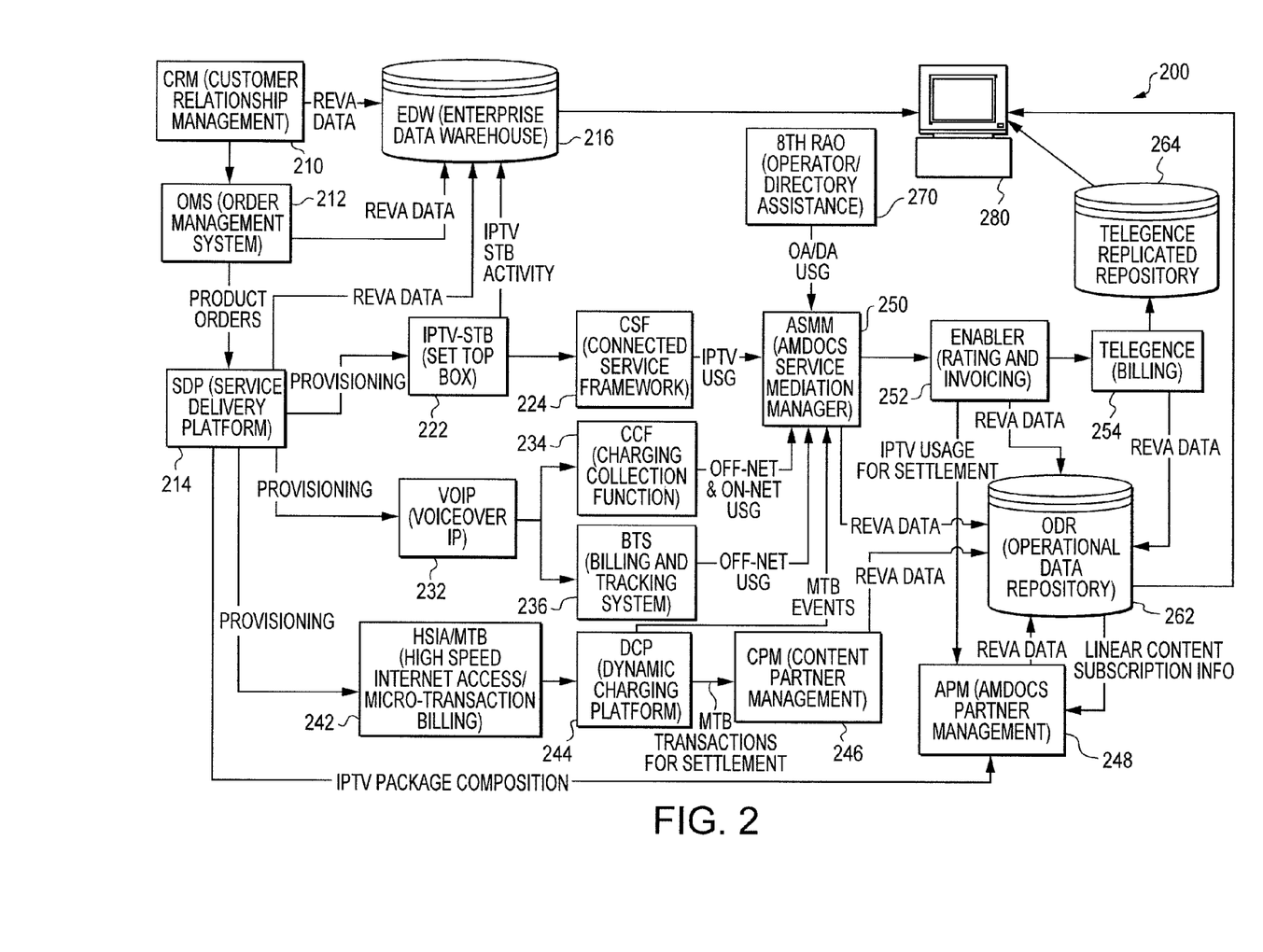
FIG. 2 shows an exemplary architecture for implementing a revenue assurance process, according to an aspect of the present disclosure.

More particularly, FIG. 2 depicts an exemplary architecture of a networked system 200 for implementing the revenue assurance process, according to an aspect of the present disclosure. The system shows three exemplary network services for which revenues are tracked and trended: integrated Internet Protocol Television (IPTV), including linear content (multiple TV channels), video on demand (VoD) and pay-per-view (PPV); voice over IP (VoIP), including local and long distance telephony services; and high speed Internet access (HSIA), including micro-transaction billing (MTB). It is understood that additional multimedia service, such as wireless, may be included without departing from the spirit and scope of the present disclosure.

These services are provided to customers (not pictured) via the system 200, and may be part of a family of services, such as LightSpeed, provided by AT&T Corp., for example, over telephone and/or fiber optic lines to customers' homes or business. It is understood, though, that the disclosed revenue assurance process may be applied to any type and number of services, including wireless network services, without departing from the scope and spirit of the present invention.

FIG. 2 depicts the platforms or network elements required to order and provision the multimedia services. The network elements may communicate over any type of wired and/or wireless local or wide area networks, including, for example, Ethernet, a private intranet, the Internet, or the like. A customer relationship management (CRM) server 210 stores information relating to the available multimedia services and customers, and further provides customer service representatives with a comprehensive view of each customer account and associated services. For example, the customer and services information may be used by agents to provision and maintain Business IP Services, such as MIS, DSL and VPN.

The order management system (OMS) 212 coordinates the provisioning and management of order entries, for example, based on data received from the OMS 212. The service delivery platform (SDP) 214 provides ordering, provisioning and activation capabilities for various services, such as IPTV, HSIA and VoIP, based on information received from the OMS 212, including new and updated product orders, as well as cancellations. The SDP 214 also provides centralized service creation and service control for cross-platform services, such as IPTV, HSIA, VoIP and wireless services, as well as product and package (content) management and user subscription management functionality.

Each of the CRM 210, the OMS 212 and the SDP 214 provides data relating to new and updated services to an enterprise data warehouse (EDW) 216. The EDW 216 consists of one or more comprehensive databases that contain customer centric data from different systems throughout the network, as well as external demographic data. In partnership with many applications, the data is transformed into information in support of the network provider for handling various business initiatives. For example, data from the EDW 216 may be used for ad hoc report creation. This is particularly essential when data is not otherwise available in the Operation Data Repository (ODR) 262, discussed below. For example, if IPTV detailed data is not available in ODR 262, it can be pulled from the EDW 216.

The SDP 214 communicates with service specific platforms based on the types of services being provisioned. For example, provisioning data is provided to an IPTV platform 222 for provisioning IPTV to a customer. Usage activity of the IPTV service by a customer is provided to the EDW 216 for storage, and to a Connected Service Framework (CSF) 224, which passes billing records from the IPTV application and transports them to a Service Mediation Manager (SMM) 250.

The SMM 250 may be, for example, an XACCT billing application or an AMDOCS (ASSM) server in various embodiments of the invention. The SMM 250 collects raw data indicating, for example, the IPTV usage, including identification of billing events. The collected data relates to all of the network services, including VoIP and HSIA, discussed below. The SMM 250 may also receive data from various additional services, such as operator and/or directory assistance, via the Revenue Account Office (RAO) 270. The SMM 250 organizes and conditions the raw data for rating in the Enabler 252, discussed below, to enable application of the correct rates.

The SDP 214 likewise provides provisioning data to a VoIP server 232 for provisioning VoIP. The VoIP service includes a charging collection function (CCF) platform 234 and a billing and tracking system (BTS) 236. The CCF platform 234 collects data relating to VoIP calls for both off-net and on-net usage of VoIP telephony services. On-net usage is when both the calling party and the called party have VoIP capability, and off-net usage is when only one of the parties has VoIP capability. The CCF platform 234 creates a complex series of usage recording for both off-net and on-net calls, and reflects one call to multiple output records. The BTS 236 provides legacy usage recording of off-net (only) calls, and reflects the traditional one call to one output record. The raw data regarding VoIP usage from the CCF 234 and the BTS 236 is provided to the SMM 250 for mediation.

Provisioning data may also be provided to an HSIA/MTB server 242 for provisioning high speed internet services. The HSIA/MTB server 242, in particular, may send billing for digital content (e.g., downloaded music, games, movies and photos, online information, online services and software) to be included on the customer's bill, thus providing the customer an alternative to using credit cards. In an embodiment, the high speed Internet service may further include a member profile system (not pictured), which is a central repository of customers storing member profiles and product services data, such as the member's handle, password, demographic information and/or information on the current products and services. In addition, the member profile system may manage service provisioning and registration of VoIP, HSIA and IPTV customers.

The dynamic charging platform (DCP) 244 collects MTB events in the high speed Internet service, such as a customer downloading music from the Internet using Napster®. Raw data relating to the MTB events are sent to the SNM 250 for mediation and ultimately billing. Also, the MTB transactions are sent to a content partner management (CPM) system 246, which is part of the vendor settlement system. The CPM system 246 consolidates charges incurred through an MTB event into the customer's telephone bill, and keeps track of the event for association with the corresponding vendor, e.g., Napster®, for settlement purposes.

Customer billing functions are implemented by the SMM 250, the Enabler 252 and the Telegence billing server 254. The SMM 250 provides mediation in front of the Enabler 252, for rating and invoicing for billing network products. For example, the application running on the Enabler 252 may apply a rate of $4.99 per unit for pay per view movies provided pursuant to the IPTV service. In an embodiment, the Enabler 252 provides the rating in real-time. The Enabler 252 also advises of charges and performs balance management. The Enabler 252 may further include AMDOCS Monitoring and Control and Billing Configurator functionality.

The rated billing data is provided by the Enabler 252 to an Operational Data Repository (ODR) 262 and, for example, an AMDOCS Partner Management (APM) platform 248. The ODR 262 is a centralized database for collecting the service data needed for performing revenue assurance. The APM 248 is a vendor settlement application, which may also receive IPTV package composition data directly from the SDP 214. The APM 248 provides billing and settlement functions particularly for IPTV partners, including VoD (Video on Demand) and PPV (Pay-Per-View). This includes, for example, managing the agreements for products and financial settlements between partners, reconciling with providers of the linear content (e.g., customer) services, and supporting tracking of payments made by partners having agreements with the network provider. For example, the APM 248 may track VoD customer orders for movies provided by a third party video provider, so that the network provider may reconcile the customer's transaction with the third party video provider when it seeks reimbursement from the network provider.

The Enabler 252 also provides the rated billing data to a Telegence billing server 254. The Telegence billing server 254 performs various administrative function, including, for example, online customer service, online billing, creating and sending bills, activation and account maintenance. The billing data from the Telegence billing sever 254 is sent to the ODR 262 and a Telegence Replicated Repository 264, which is a replicated database.

The EDW 216, the ODR 262 and the Telegence Replicated Repository 264 are all repositories for data relied upon by the revenue assurance process. These repositories are separate from the on-line systems, so that the revenue assurance application, e.g., running on the computer system 280, does not pull data from the actual multi-media system. Rather, the computer system 280 is configured to collect data from the ODR 262, the EDW 216 and the Telegence Replicated Repository 264. In an embodiment, the alert rules may be created using information from the ODR 262, while ad hoc reports may be created using information from the EDW 216 and the Telegence Replicated Repository 264, as well as the ODR 262.

In an embodiment, the data that is monitored and processed to determine whether and when alert rules are triggered is collected from various control points (although the data is actually provided to the revenue assurance application via the EDW 216, the ODR 262 and/or the Telegence Replicated Repository 264). For example, FIG. 2 depicts five types of alert data control points, discussed above and summarized herein. First, there are the "raw data" or "detailed data" control points, including the CSF platform 224 for IPTV, the CCF platform 234 and the BTS 236 for VoIP, and the DCP 244 for HSIA, each of which provide data relating to the implementation and usage of the multimedia services. Second, there is a "mediation" control point, including the SMM 250, which collects and consolidates data from the various services. Third, there is a "rating" control point, including the Enabler 252, which associates charges with service usage. Fourth, there is the "billing" control point, including the Telegence billing server 254, which determines the identity and amount of bills to be sent to customers based on usage, rating and the like. Fifth, there are "settlement" control points, including the CPM 246 and the APM 248, which manage agreements and reconcile usage and billing with respect to the corresponding vendors and service providers.

Figure 3:
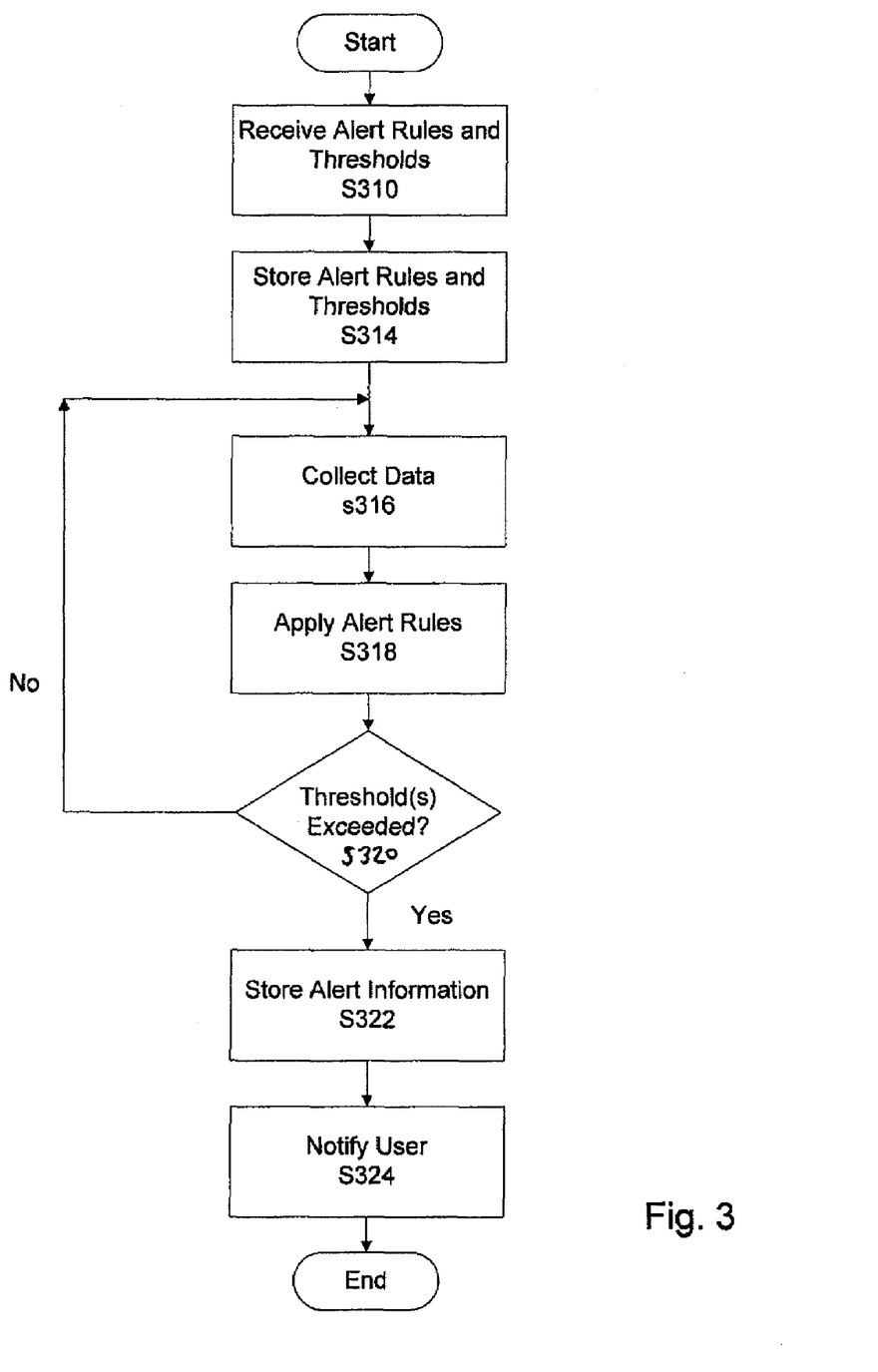
FIG. 3 shows an exemplary flowchart of the revenue assurance process, according to an aspect of the present disclosure.

FIG. 3 is a flow diagram of an exemplary implementation of the revenue assurance process, which may be executed, for example, on the computer system 280. At step s310, the alert rules and corresponding alert rule thresholds are created by a user. The alert rules may be based on established business rules of the multimedia service system.

In an embodiment of the disclosure, there are two types of alert rules that may be built: tracking alert rules and trending alert rules. Tracking rules monitor end-to-end data stream accuracy across different multimedia service functions. The monitoring includes, for example, product and service ordering, product and service provisioning and customer billing. The monitoring may also include vendor settlement, which involves the multimedia service provider, such as a telephone company, being billed by various venders based on the multimedia service provider's usage (via its customers) tracked by the vendors. Trending rules monitor the behavior of a specific data component within a set period of time. For example, instead of merely collecting data on off-net VoIP usage and on-net VoIP usage (discussed above), a trending rule may be established to monitor the rate of increased on-net VoIP usage as compared to off-net VoIP usage.

Each of the alert rules has a corresponding threshold for determining when an alert is to be triggered based on the particular rule. For example, based on the alert thresholds, alerts may be triggered for sudden increases or decreases in the data for trending rules, and alerts may be triggered for data discrepancies within functions defined in tracking rules. In an embodiment, there are three alert threshold levels: high, medium and low. Each alert threshold level corresponds to a rule anomaly severity level, and may be set to trigger different levels of response. For example, a high threshold alert may result in paging the user, whereas a low threshold alert may result in simply providing a notice of the event to an alert web site, which will be viewed at the user's convenience.

The alert rules trigger alerts when one or more of the corresponding alert threshold levels are exceeded. For example, an alert rule may be based on a comparison of the number of new VoIP service connections initially provisioned and the number of new VoIP service connections billed during the same time period. During a time period when 1000 new VoIP service connections were provisioned, 900 billed (90%) may be a high threshold level, triggering a high discrepancy alert, 950 billed (95%) may be a medium threshold level, triggering a medium discrepancy alert, and 990 billed (99%) may be a low threshold level, triggering a low discrepancy alert. The threshold levels are discussed in further detail with respect to FIG. 8, below.

In an embodiment, there are two alert threshold set-up options: key-level and default. Key-level thresholds are applied only to a specific set of key values existing in all of the data components defined in the alert rule. For example, the IPTV service may include key values for video-on-demand or pay-per-view. Default thresholds are applied to all data components in the alert rule, regardless of key values.

The repository components needed for alert rule creation are provided by the ODR 262 and may be stored, for example, in configuration tables. The configuration tables are updated as new repository components become available, eliminating the need for software changes. The revenue assurance process allows the user to interactively build the alert rules and corresponding alert thresholds by selecting the repository components from the configuration tables, thus assuring that the alert rules rely only components that are available. Building alert rules is discussed below, with respect to FIGS. 4-7, which depict exemplary screen shots for building alert rules.

At step s314, the alert rules and corresponding alert thresholds are stored for execution. The alert rules and thresholds may be stored, for example, in the computer system 280, although it is understood that the alert rules and thresholds may be stored and executed by any server or other processor capable of collecting the data, processing the rules and initiating alert, without departing from the spirit and scope of the present disclosure. As data is collected from the multimedia network elements, e.g., shown in FIG. 2, the information is passed to the revenue assurance application at step s316. The tracking and/or trending alert rules and corresponding thresholds are applied to the tracking and trending results at step s318, respectively. The tracking and trending alert rules may be applied either continuously or at some predetermined intervals, according to the desires of the user. For example, data collected regarding the multimedia services may be tracked over a 12 hour period before a particular alert rule is applied to that data.

At step s320, it is determined whether a threshold corresponding to each alert rule has been exceeded. Although depicted as a single decision block, it is understood that step s320 is intended to indicate that all of the alert rules (activated by the user) are to applied according to their respective parameters and intervals. When an alert threshold has been exceeded (step s320; YES), data identifying the alert rule and the nature of the triggering of the alert is stored in a database (not pictured) at step s322. As discussed above, alerts may be triggered by revenue leakage, data anomalies and application or system defects, as indicated by the tracking and/or trending procedures. In an embodiment, the stored data may further include, for example, the tracking and trending information leading to the triggering of the alert. Also in an embodiment, all of the alert details are available within the revenue assurance application.

At step s324, the user or user group who owns the alert rule are notified of the alert(s) triggered by that alert rule at step s320. For example, the user, or service provider, may be notified, in real-time, via e-mail, text messaging, paging or the like. An e-mail may contain, for example, a brief description of the alert and other information to inform the user of the nature of the possible problem. The alerts may also be posted to a web site or other central repository accessible by the user at the user's convenience. The web site may be updated immediately upon detection of an alert, or the alert data may be periodically updated at predetermined intervals (e.g., daily).

After the user notification has been provided at step s324, or when no alert thresholds have been exceeded (step s320; NO), the process effectively returns to step s316, continuing to collect data, monitor tracking and trending information, and apply active alert rules.

Although FIG. 3 depicts a particular sequence of steps, it is understood that the sequence is exemplary to an embodiment, and is not intended to be limiting. For example, in alternative embodiments, the order of the steps may differ, or the various steps may occur simultaneously, without affecting the scope or spirit of the disclosure. Also, although depicted linearly, the various embodiments may be implemented through object oriented programming techniques.

Figure 4:
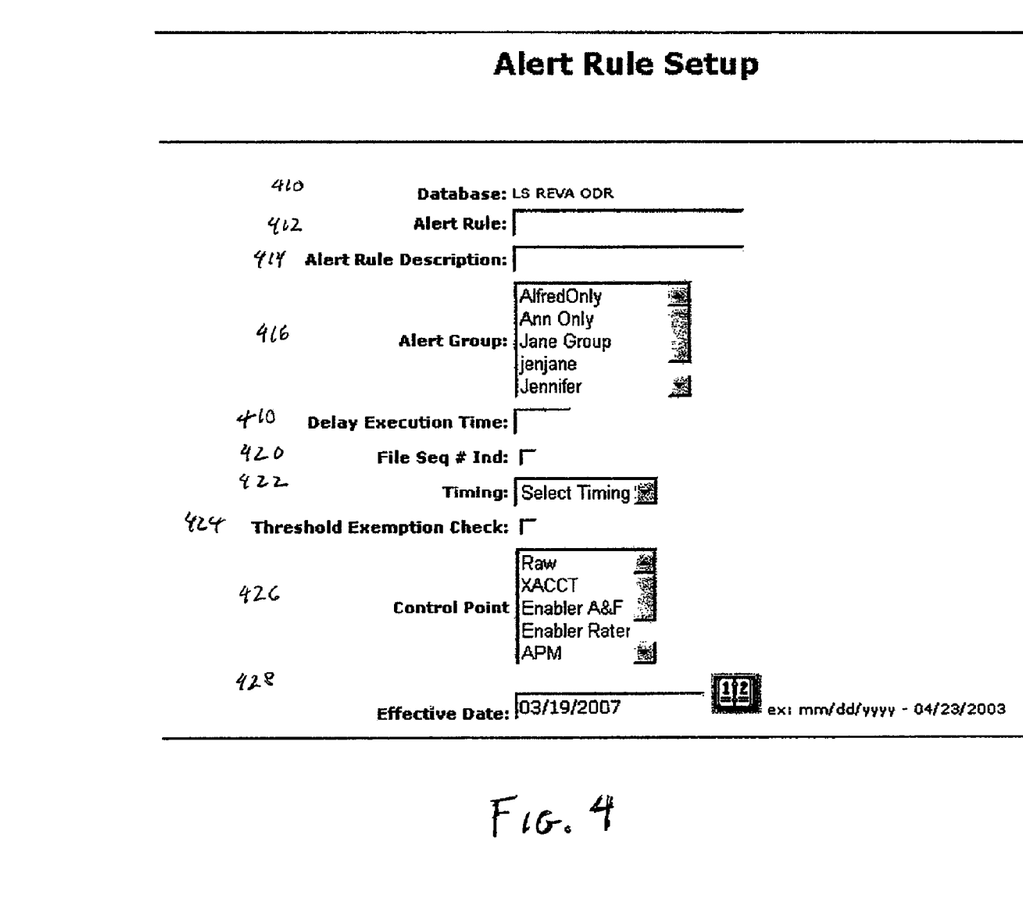
FIG. 4 shows an exemplary screenshot enabling the set up of alert rules, according to an aspect of the present disclosure.

FIG. 4 depicts an exemplary screen shot, displayed for example at a monitor of the computer system 280, to begin setting up a new alert rule. The database field 410 identifies the ODR (e.g., the ODR 262 of FIG. 2) or other data repository from which the multimedia service data is collected. In an embodiment, this field is not variable by the user, and is permanently set to the appropriate data repository. The Alert Rule field 412 and the Alert Rule Description field 414 may be completed with an alert rule name and an associated description of the alert rule, enabling the user to readily identify each rule that has been created.

The Alert Group field 416 is filled in with the name or other identification of the user and/or user group to be notified, e.g., at step s324 of FIG. 3, when an alert is generated. Although not depicted, it is understood that the notification information, such as email addresses for all group members, may be separately set up and stored in association with the alert group names depicted in the Alert Group field 416. In alternative embodiments, the alert group names (and contact information) may be individually entered by the user, or may be selected from a drop down list of previously established alert group names.

The Delay Execution Time field 418 enables the user to identify the time (e.g., days, hours or minutes) by which implementation of the alert rule identified in the Alert Rule field 412 should be delayed. For example, a "0" entered in the Delay Execution Time field 418 would result in immediate implementation of the rule (subject to data tracking and/or trending requirements). The Delay Execution Time field 418 correlates with the Effective Date field 428, which identifies the date the Alert Rule 412 begins executing.

The File Seq # Ind field 420 indicates, for some of the data, file sequence numbers, which may be assigned to predetermined data corresponding to various data parameters on which alert rules are based. In the context of an alert rule, the file sequence data numbers should match in each of the various network elements. For example, the data assigned file sequence data number 1 in the SMM 250 should correlate to the data assigned file sequence data number 1 in the Enabler 252.

The Timing field 422 enables the user to select the timing of the data to be used. In an embodiment, there are two types of timing that may be selected: bill day and records. Bill day indicates that the timing is based on a billing period, such as the day when billing closes. For example, an alert rule may check and compare charges on the bill day. Records timing involves information that is not necessarily tied to the billing cycle. For example, an alert rule may be based on minutes of VoIP usage over the past 10 days, irrespective of the billing period.

The Threshold Exemption Check field 424, when checked, indicates that an exemption exists for the lowest key level existing for the alert rule. In other words, not all of the loaded data is tracked or trended. Only the data with a defined threshold (at lowest key-level) is extracted and tracked or trended.

In an embodiment, at least one key level threshold should be defined, or a system message may be generated, even though a rule default threshold is defined. For example, trending error codes may require trending only specific error code values. To accomplish this, a rule is defined to trend the appropriate column, with the checkbox checked, discussed below with respect to FIG. 6. After the alert rule is defined, the user sets the threshold(s) for the error codes desired to be trended. There should be at least one error code defined. All other error codes with no threshold defined will not be trended, and no system message will be generated for these.

When the Threshold Exemption Check 424 is not checked, the user can either define the threshold by rule default or by key level definition. The revenue assurance tool may look at the key level definition first to determine whether the entry exists for a particular key value. When one does exist, the rule is processed based on the key level threshold defined. If no key level threshold is defined for a particular key value, the rule default is used. If no rule-default is defined, a system message may be generated.

The Control Point field 426 indicates the control points within the network 200 from which data is selected, as discussed above. The control points may be used as a search report filter. The control points may correspond to the various network elements identified in FIG. 2 from which data involving service usage and corresponding vendor settlements are collected (e.g., via the ODR 262). In alternative embodiments, the control point options may be individually entered by the user, or selected from a drop down list (as depicted in FIG. 4) of previously established alert group names. For example, with respect to the VoIP service, the "Raw" control point indicates data collected from the CCF platform 234 and the BTS 236, and the "XACCT" control point indicates data collected from the SMM 250.

Figure 5:
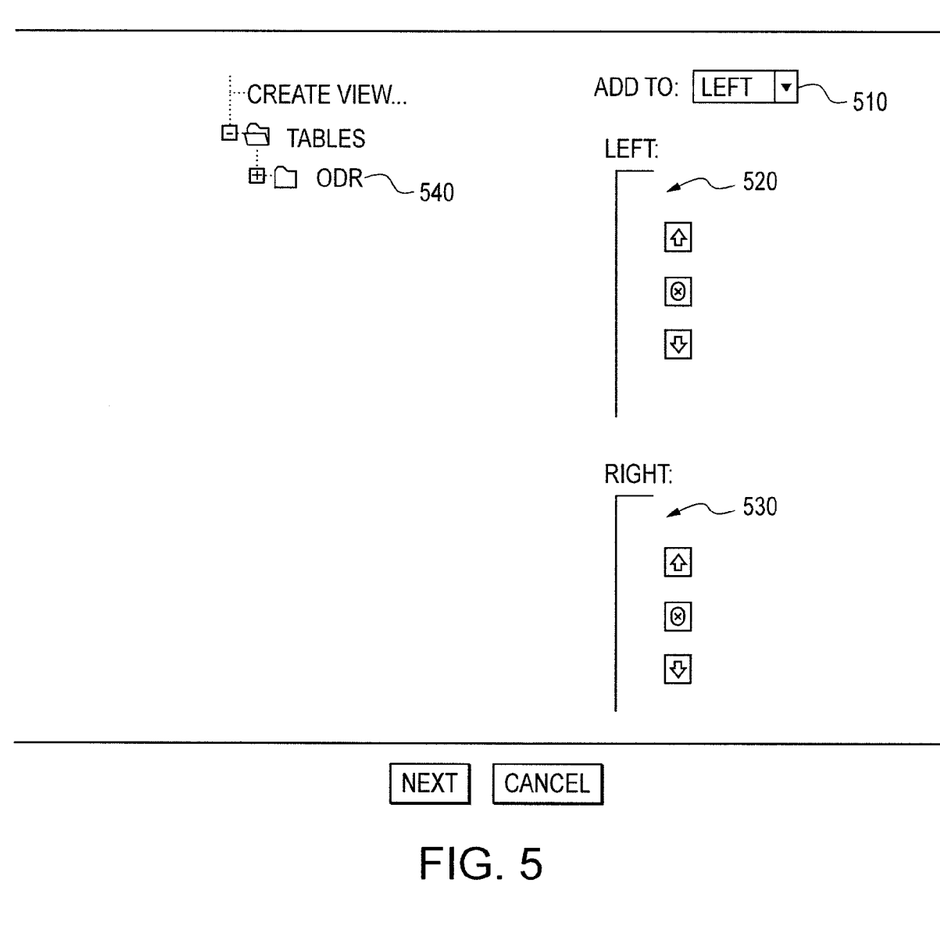
FIG. 5 shows an exemplary screenshot enabling the set up of alert rules, according to an aspect of the present disclosure.

FIG. 5 depicts an exemplary screen shot, displayed for example at a monitor of the computer system 280, for building relationships among the various parameters, or rule components, available from the system in order to create an actual Alert Rule. The Left field 520 and the Right field 530 respectively include the parameters for the left and right sides of the Alert Rule equation (or relationship). The field to which parameters are to be added (i.e., 520 or 530) is selected using the Add To field 510. For example, when the Add To field 510 indicates "left," any selected parameters are entered into the Left field 520, e.g., in the order in which the parameters are identified. In the depicted embodiment, the parameters may be selected from the ODR file folder 540, which, when opened, lists all of the parameter (or table) names from which the alert rule equation may be built. The up and down arrows next to the Left field 520 and the Right field 530 enable the user to scroll through the parameters currently entered in each field.

To build an Alert Rule equation, the user may select from a list of pre-established parameters (drawn from various control points, e.g., identified in the Control Point field 426), which represent specific data relating to the multimedia system. For example, an Alert Rule relationship may include the following parameters, which, in an embodiment, identify tables from the ODR 262:

RAW=XACT Bill, Dup, Error

To build this equation, the user simply inputs the RAW parameter into the Left field 520 and the XACT Bill, the Duplicate and the Error parameters into the Right field 530, in the appropriate order. The relationship effectively translates into the following equation:

RAW=XACT Bill+Dup+Error

This means the that Raw data relating to a multimedia server, such as IPTV or VoIP usage, must equal the events billable to the customers (XACT Bill) plus duplicative events (Dup) plus errors detected in billing and/or unbillable events (Error). If the left and right sides of the equation match (or are within a desired threshold, discussed below), then usage and billing of the service is entirely accounted for. If the left and right sides of the equation do not match (or exceed the threshold), then the alert is triggered, indicating that usage and revenue are not properly reconciled.

Figure 6:
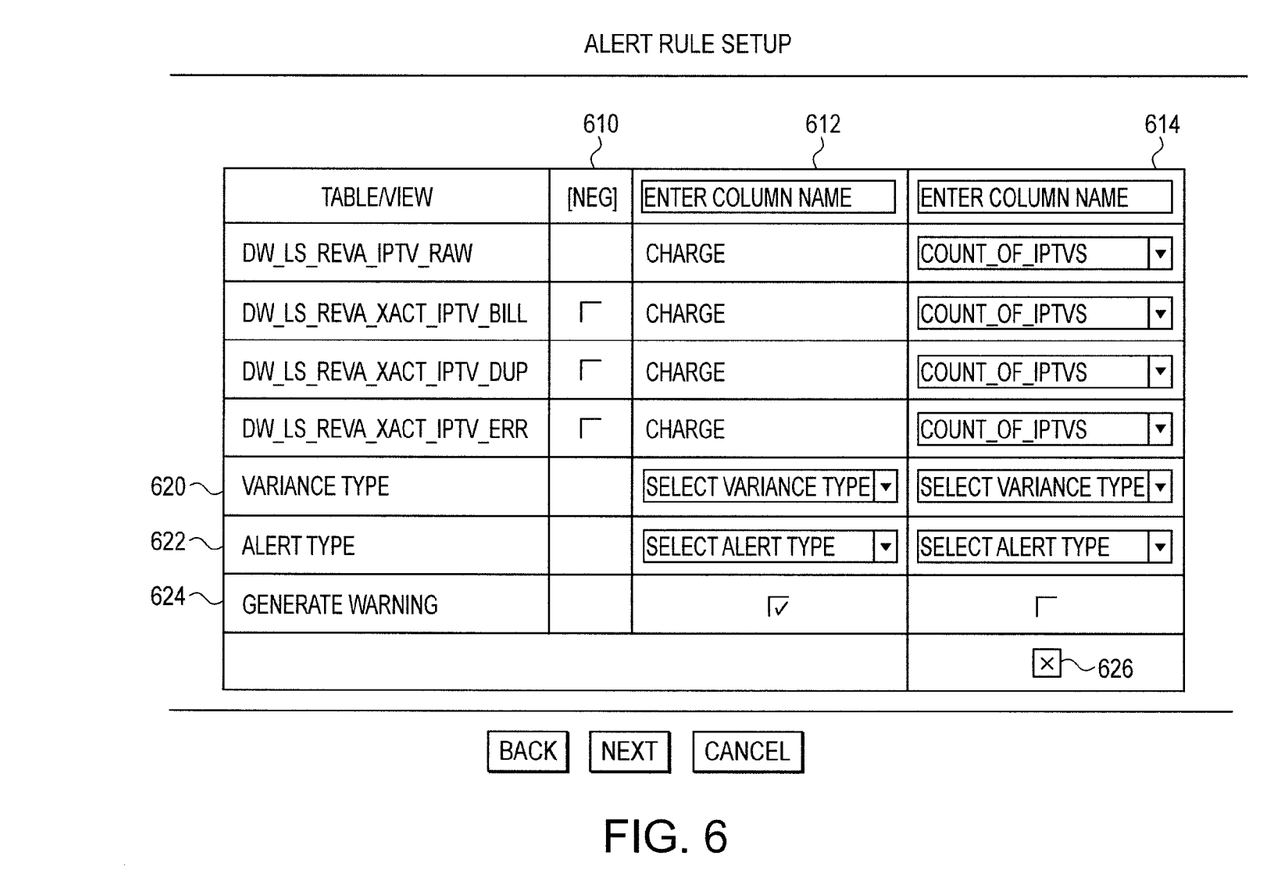
FIG. 6 shows an exemplary screenshot enabling the set up of alert rules, according to an aspect of the present disclosure.

FIG. 6 depicts an exemplary screen shot, displayed for the user to provide additional detail defining the alert rule, initiated in FIGS. 4 and 5. The Table/View column 608 lists the actual table names corresponding to the alert rule parameters. The tables may be built and/or stored in the ODR 262, as discussed above. For example, the table name DW_LS_REVA_IPTV_RAW represents the raw data for IPTV services, e.g., collected from the CSF platform 224 and stored in the ODR 262. In the depicted embodiment, the term REVA stands for "revenue assurance," and indicates that the particular table includes data summarized by the ODR 262. Table names that do not include REVA indicate that the data is in detail level and, although stored in the ODR 262, is not summarized.

In the depicted, exemplary alert rule, DW_LS_REVA_IPTV_RAW (entered in the Left field 520 of FIG. 5) is related to the sum of DW_LS_REVA_XACT_IPTV_BILL, DW_LS_REVA_XACT_IPTV_DUP and DW_LS_REVA_XACT_IPTV_ERR (all entered in the Right field 530 of FIG. 5). The table name DW_LS_REVA_IPTV_XACT_BILL represents mediation data indicating events billable to customers for IPTV services; the table name DW_LS_REVA_XACT_IPTV_DUP represents mediation date indicating duplicative events for IPTV services; and the table DW_LS_REVA_XACT_IPTV_ERR represents medication raw data indicating errored events (not billable) for IPTV services. The mediation data for each of these tables is collected, for example, from the SMM 250.

It is understood that the table names and contents discussed above are intended to be non-limiting examples of components of an exemplary alert rule, and the types of tables and alert rule relationships which a user may wish to implement for revenue tracking and reconciliation purposes may vary without departing from the spirit and scope of the present disclosure. Other alert rule components, which may be used to build alert rules according to aspects of the present invention, may further include the following non-limiting list of table names:

```
DW_LS_REVA_MTB_RAW
DW_LS_REVA_XACT_MTB_ERR
DW_LS_REVA_XACT_MTB_DUP
DW_LS_REVA_XACT_MTB_BILL
DW_LS_REVA_ENAB_IPTV_GD
DW_LS_REVA_ENAB_MTB_GD
DW_LS_REVA_ENAB_IPTV_ARCY
DW_LS_REVA_ENAB_MTB_ARCY
DW_LS_REVA_ENAB_IPTV_ERR
DW_LS_REVA_ENAB_MTB_ERR
DW_LS_REVA_ENAB_IPTV_REJ
DW_LS_REVA_ENAB_MTB_REJ
DW_LS_REVA_ENAB_IPTV_RT
DW_LS_REVA_ENAB_MTB_RT
DW_LS_REVA_CYC_STAT
DW_LS_REVA_ADJUSTMENT
DW_LS_REVA_CPM_STTL
DW_LS_REVA_APM_LD_IPTV
DW_LS_REVA_APM_ERR_IPTV
DW_LS_REVA_APM_DRP_IPTV
DW_LS_REVA_ENAB_APM_IPTV
DW_LS_APM_LD_LC
DW_LS_APM_COMMIT_PLAN
DW_LS_APM_BILLED_INV
DW_LS_APM_ACC
DW_LS_APM_ADJ
DW_LS_APM_LCONT
DW_LS_APM_LCONT_MONTHLY
DW_LS_APM_ERR_LC
DW_LS_REVA_BTS_RAW
DW_LS_REVA_CCF_RAW
DW_LS_REVA_CRIS_RAW
DW_LS_REVA_ENAB_VOIP_ARCY
DW_LS_REVA_ENAB_VOIP_BILLED
DW_LS_REVA_ENAB_VOIP_ERR
DW_LS_REVA_ENAB_VOIP_GD
DW_LS_REVA_ENAB_VOIP_REJ
DW_LS_REVA_ENAB_VOIP_RT
DW_LS_REVA_XACT_BTS_DROP
DW_LS_REVA_XACT_BTS_ERR
DW_LS_REVA_XACT_CCF_DROP
DW_LS_REVA_XACT_CCF_ERR
DW_LS_REVA_XACT_CRIS_DROP
DW_LS_REVA_XACT_CRIS_ERR
DW_LS_REVA_XACT_VOIP_BILL
```

Referring back to FIG. 6, the [Neg] column 610, when checked, indicates that the particular parameter (i.e., table name) is to be subtracted from the other parameters on the same side of the alert rule equation. Otherwise, the parameters are added to one another.

The Enter Column Name column 612 indicates a field or column of the corresponding table to be included in the Alert Rule. For example, CHARGE indicates that the Raw data to be collected is from the CHARGE field of the DW_LS_REVA_IPTV_RAW table. In an embodiment, the CHARGE field includes data, e.g., representing usage or services to be charged to the customer. The Enter Column Name column 614 similarly indicates another column or field from the corresponding table to be tracked. In the depicted embodiment, the COUNT_OF_IPTVS field of the DW_LS_REVA_IPTV_RAW table is indicated. This field includes data, e.g., representing IPTV event counts for the customers. A column may be removed or unselected from the alert rule by clicking the check box 626.

Each of the columns 612 and 614 include a variance type, indicated by Variance Type row 620. The variance type defines each column's data type and may include, for example, REVENUE, MINUTES OF USAGE and EVENT. In the depicted embodiment, the CHARGE field has a Variance Type of REVENUE, indicating that it is tied to bills generated for the customers, and the COUNT_OF_IPTVS field has a Variance Type of EVENT, because IPTV counts are considered events.

Each of the columns 612 and 614 also includes an alert type, indicated by Alert Type row 622. The alert type indicates when to produce an alert according to the variance of the equation results, and it is therefore related to the threshold(s) for the Alert Rule. A standard deviation may be determined by threshold constraints. For example, the alert types may include the following four relationships to the thresholds (e.g., with no standard deviation): (i) the variance is within the high and low boundaries of the threshold; (ii) the variance is less than or equal to the high boundary of the threshold; (iii) the variance is greater than or equal to the low boundary of the threshold; and (iv) the variance is equal to the high threshold.

When the condition of the Alert Type 622 is met, an alert is generated (and provided to the user, e.g., as indicated in step s324 of FIG. 3), whenever the corresponding Generate Warning field 624 is checked. This indicates that the alert constraints have been violated. The user is then able to take steps to identify the billing and/or settlement discrepancies and take corrective actions. Also, if the problem causing violation of the alert constraints is systematic, the user may take steps to correct the problem so that future billing and/or settlements reconcile within the indicated constrains.

Figure 8:
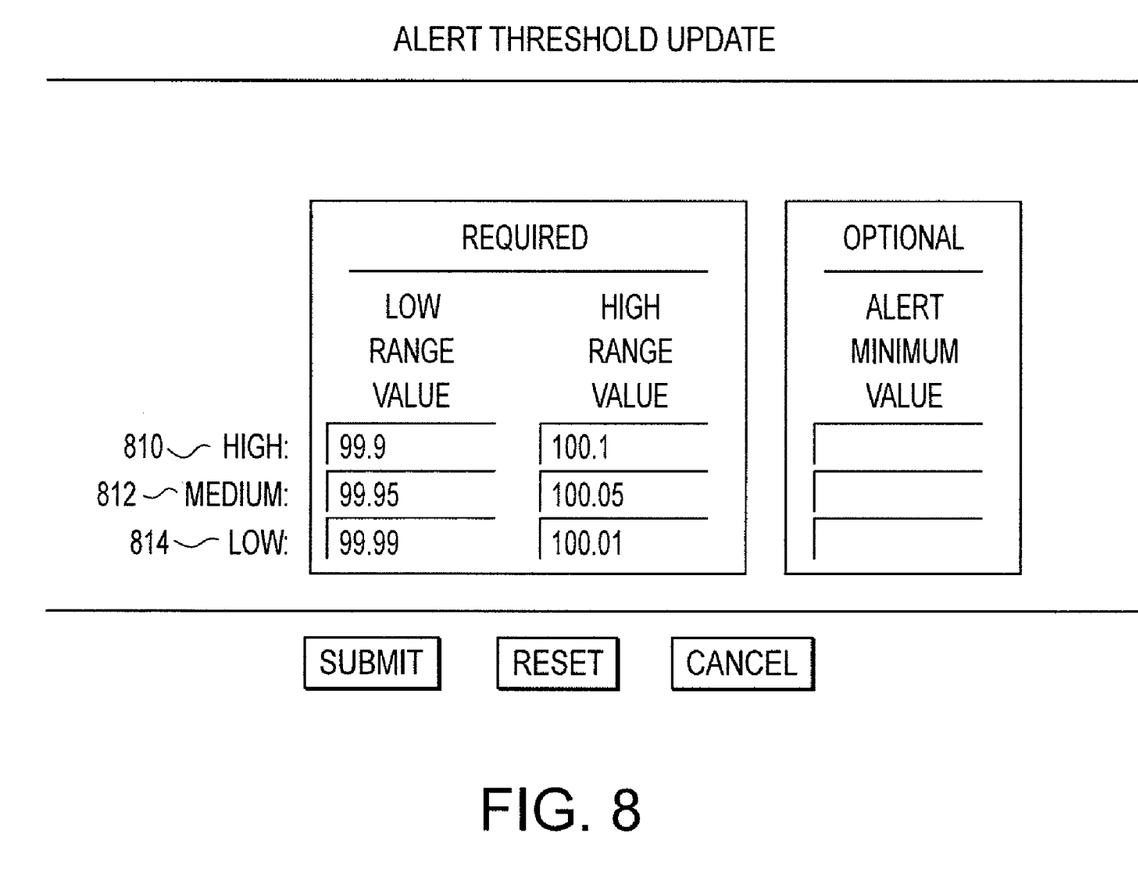
FIG. 8 shows an exemplary screenshot enabling the setting of threshold levels, according to an aspect of the present disclosure.

Setting the thresholds for an alert rule is depicted, for example, in the screen shot of FIG. 8. The screen shot indicates a High threshold 810, a Medium threshold 812 and a Low threshold 814 based on exemplary variances of 1.0 percent, 0.05 percent and 0.01 percent, respectively. Based on these thresholds, a low alert is generated when the right side value of the alert rule equation is less than or equal to 99.99 and greater than 99.95, or when the right side value is greater than or equal to 100.01 and less than 100.05. A medium alert is generated when the right side value of the alert rule equation is less than or equal to 99.95 and greater than 99.9, or when the right side value is greater than or equal to 100.05 and less than 100.1. A high alert is generated when the right side value of the alert rule equation is less than or equal to 99.9, or when the right side value is greater than or equal to 100.1.

Figure 7:
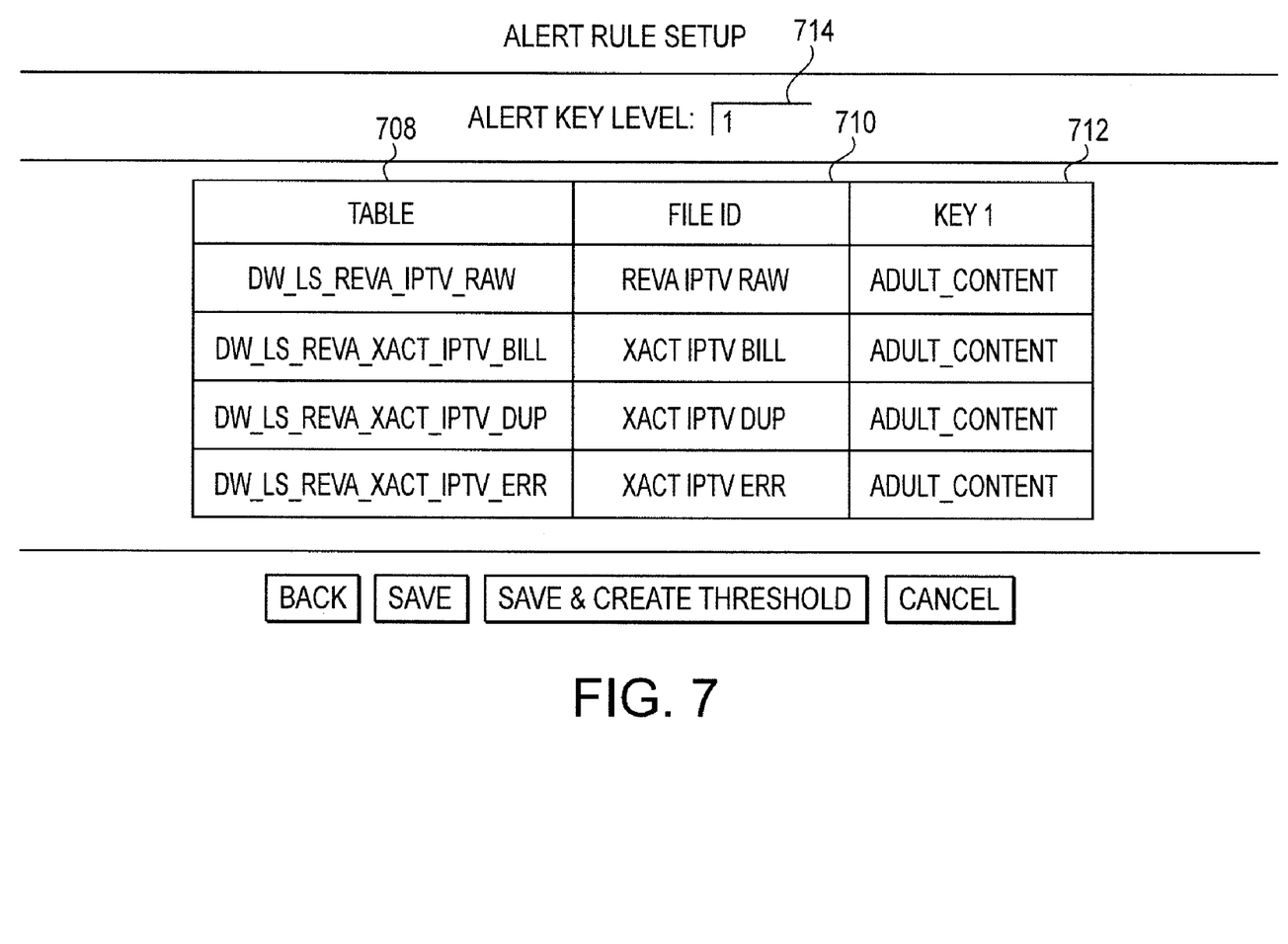
FIG. 7 shows an exemplary screenshot enabling the set up of key level thresholds, according to an aspect of the present disclosure.

FIG. 7 depicts an exemplary screen shot, displayed to the user in order to choose alert keys during alert rule set up, according to an embodiment of the present disclosure. The purpose of the alert keys is to match data among the tables used in the alert rule. In an embodiment, up to five alert keys may be chosen for a rule, each being consecutively indicated, for example, in the Alert Key Level box 714. The values of these keys may be used to define key-level thresholds for triggering alerts. The Table column 708 of FIG. 7 identifies the same tables included in the alert rule equations, as indicated in column 608 of FIG. 6. The File ID column 710 indicates an optional identification number or name associated with the table names for the user's convenience. The Key 1 column 712 indicates the key, based on a field or value in the corresponding table. The alert rule may include multiple keys, each of which is identified by the corresponding Alert Key Level box 714.

The screen shot depicted in FIG. 7 shows that the Alert Key Level 714 and the Key 1 column 712 match, so that the Key 1 column 712 displays the value on which Alert Key Level 1 714 is based. In particular, the screen shot shows that Key 1 is based on ADULT_CONTENT, which is a separate variable in each of the tables identified in Table column 1. In other words, Key 1 triggers an alert based only on the tracking and/or trending of the ADULT_CONTENT value. Additional key level thresholds may be added by incrementing the Alert Key Level 714 and entering the desired field. Query results will be grouped by the key field selected.

For purposes of example, the following non-limiting list of keys and values for various multimedia services may be used to build alert rules according to an aspect of the present disclosure:

| IPTV Potential Keys | IPTV Values |
|---|---|
| EVENT_TYPE | IPTV |
| SERVICE_PROVIDER_ID | Disney |
| | HBO, etc. |
| GENRE (or CONTENT_CATEGORY) | FANTASY |
| | HORROR |
| | SPORTS |
| | ACTION, etc. |
| ADULT_CONTENT | Y |
| | N |
| RESOURCE_TYPE | LC (linear content) |
| | VOD |
| | PPV, etc. |
| SOURCE_CODE_END | MSCF [Set Top Box]) |
| MTB Potential Keys | MTB Values |
| EVENT_TYPE | MTB |
| MERCHANT_ID | NAPSTER |
| | ITUNES, etc |
| SOURCE_CODE_IND | DCP |
| BTS/CCF Potential Keys | BTS/CCF Values |
| MARKET_IND | RETAIL |
| EVENT_TYPE | VOIP |
| SOURCE_CODE_IND | CCF (in CCF tables) |
| | BTS (in BTS tables) |
| VoIP Potential Keys | VoIP Values |
| SOURCE_CODE_IND | CCF |
| | BTS |
| | CRIS |
| MARKET_IND | RETAIL |
| EVENT_TYPE | VOIP |
| JURISDICTION | Intrastate-Intralata |
| | Intrastate-Interlata |
| | Inerstate-Intralata |
| | USA-to-International, etc. |
| ON_NET_OFFNET_IND | OFF-NET |
| | ON-NET |
| CALL_TYPE | OA (operator assistance) |
| | DA (directory assistance) |
| | OFF-NET |
| | IDDD (international), etc. |

Although FIGS. 4 through 8 discuss alert rules relating to customer billing revenues, it is understood that the same concepts apply to building and triggering alert rules relating to settlement revenues. For example, the raw data for VoIP services (on the left side of an alert rule equation) may be compared to the charges by a telecommunications network provider, e.g., for off-net usage (on the right side of the alert rule equation). Likewise, revenue being billed by the service provider to customers, e.g., determined based on data generated by the Telegence billing server 254 and stored in tables in the ODR 262, may be compared to revenue being billed to the network provider by service vendors, e.g., determined based on data generated by the APM 248 and stored in tables in the ODR 262.

Referring to FIGS. 5-7, an exemplary vendor settlement alert rule may include the table DW_LS_APM_LD_LC in the Left field 520 and the table DW_LS_APM_ACC in the Right field 530. DW_LS_APM_LD_LC contains loaded inbound Linear Content data. Data after this stage is accumulated, for example, in DW_LS_APM_ACC, until the billing cycle is confirmed. DW_LS_APM_ACC may include not only Linear Content data, but also other IPTV data such as Video On-Demand and Pay-Per-View. The resulting alert rule would thus compare billed revenue of loaded linear content of the APM 248 (Left field 520), with the linear content billed revenue from accumulated IPTV settlement data of the APM 248 (Right field 530).

The alert items for DW_LS_APM_LD_LC (e.g., which would appear in columns 612 and 614 of FIG. 6) may include, for example, "subscriber rack charge," having a variance type (e.g., Variance Type 620) of REVENUE and an alert type (e.g., Alert Type 622) of high/low thresholds; "settlement charge," having a variance type of REVENUE and an alert type of high/low thresholds; and "number of events," having a variance type of EVENT and an alert type of within high/low thresholds. This means that the "subscriber rack charge" and "settlement charge" fields of the DW_LS_APM_LD_LC table are of the REVENUE data type, and the "number of events" field of the DW_LS_APM_LD_LC table is of the EVENT data type, as discussed above. Similarly, the alert items for DW_LS_APM_ACC may include, for example, "subscriber rack charge," having a variance type (e.g., Variance Type 620) of REVENUE and an alert type (e.g., Alert Type 622) of high/low thresholds; "settlement charge," having a variance type of REVENUE and an alert type of high/low thresholds; and "number of events," having a variance type of EVENT and an alert type of within high/low thresholds.

Each of the tables (Left field 520 and Right field 530) may also have an Alert Key (e.g., Key 1 column 712 of FIG. 7). For example, the APM_RESOURCE_TYPE alert key may be entered to establish an alert rule threshold. In an embodiment, each alert rule should have at least one alert key to match data among all tables in the alert rule. The alert key may also be used to set up alert key-level (alert key-value-specific) thresholds. In the depicted example, the APM_RESOURCE_TYPE alert key may define for each event of particular service, e.g., instances of Pay-Per-View orders in the IPTV service, the orders placed by customer(s), the revenue received from the customer(s) and the revenue owed to the associated vendor(s).

In this manner, the present disclosure enables a multimedia service provider to track data simultaneously from several different types of services, including customer usage, customer billings and vendor settlements. Information relating to the various services, including revenue billed to customers and owed to vendors, may be associated in alert rules having corresponding thresholds to automatically flag potential problems relating to billing and system operations, and thus to help assure that the appropriate amount revenue is being received by the service provider. The service provider is notified of the triggered alerts (i.e., alerts associated with alert rules having associated thresholds that have been crossed), so that further investigation and timely corrective action may be taken.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A system for reconciling revenue discrepancies relating to customer billing and vendor settlements for multimedia services provided by a plurality of different vendors through a network, the system comprising:
   an alert rule component repository configured to store alert rule components needed for the creation of alert rules in configuration tables, wherein a system user interactively creates at least one alert rule and at least one corresponding alert rule threshold by selecting alert rule components from the configuration tables, the alert rule having at least two set-up options including a tracking alert rule option and a trending alert rule option, and the alert rule threshold having at least three set-up options including a key-level threshold option that applies only to a specific set of key values, a default option that applies to all data, and a multiple alert threshold option;
   a data repository configured to store a plurality of data tables, each data table including data collected from a plurality of network elements in the network and relating to vendor settlement and at least one of customer usage, mediation and customer billing; and
   a processor configured to execute the at least one alert rule based on data retrieved from at least one data table of the plurality of data tables stored in the data repository, the at least one alert rule comprising a comparison between the at least one data table and at least one other data table of the plurality of tables;
   wherein the processor triggers an alert associated with the at least one alert rule when the corresponding alert rule threshold associated with a revenue discrepancy is exceeded based on the comparison, and initiates reporting of the triggered alert, and
   wherein the alert is triggered based on one of four user-selectable trigger options, including (1) when a variance is within a high boundary and a low boundary of the threshold, (2) when a variance is less than or equal to a high boundary of the threshold, (3) when a variance is greater than or equal to the low boundary of the threshold, and (4) when a variance is equal to a high boundary of a threshold.

2. The system of claim 1, wherein the tracking alert rule option includes creating a tracking alert rule that monitors end-to-end data stream accuracy across different multimedia service functions, and the trending alert rule option includes creating a trending alert rule that monitors the behavior of a specific data component with a set period of time.

3. The system of claim 1, wherein reporting of the triggered alert comprises sending a notice identifying the at least one alert rule.

4. The system of claim 3, wherein sending the notice comprises at least one of paging or sending an email to a service provider.

5. The system of claim 3, wherein sending the notice comprises posting the notice in a web page report, accessible to a service provider.

6. The system of claim 1, wherein the multiple alert threshold option comprises three separate thresholds, including a high level alert threshold, a medium level alert threshold and a low level alert threshold, wherein each of the three thresholds has a different user selectable response due to the triggered alert.

7. The system of claim 1, wherein the triggered alert indicates that a customer billing does not match a vendor settlement.

8. A method of revenue discrepancy reconciliation of customer billing and vendor settlements for multimedia services provided by a plurality of different vendors through a service network, the method comprising:

creating at least one alert rule and at least one corresponding alert rule threshold, by a user interactively selecting alert rule components from configuration tables stored in an alert rule component repository, the alert rule having at least two setup options including a tracking alert rule option and a trending alert rule option, and the alert rule threshold having at least three set-up options including a key-level threshold option that applies only to a specific set of key values, a default option that applies to all data, and a multiple alert threshold option;

executing the at least one alert rule;

applying the executed alert rule to data stored in a plurality of data tables in a data repository;

determining, by a processor, whether the executed alert rule threshold has been exceeded based on application of the executed alert rule, an alert associated with the rule being triggered when the threshold value has been exceeded; and reporting when the alert has been triggered, indicating a possible revenue discrepancy, wherein the alert is triggered based on one of four user-selectable trigger options, including (1) when a variance is within a high boundary and a low boundary of the threshold, (2) when a variance is less than or equal to a high boundary of the threshold, (3) when a variance is greater than or equal to the low boundary of the threshold, and (4) when a variance is equal to a high boundary of a threshold.

9. The method of claim 8, wherein the tracking alert rule option includes creating a tracking alert rule that monitors end-to-end data stream accuracy across different multimedia service functions, and the trending alert rule option includes creating a trending alert rule that monitors the behavior of a specific data component with a set period of time.

10. The method of claim 8, wherein reporting when the executed alert rule has been triggered comprises sending a notice identifying the triggered alert.

11. The method of claim 10, wherein sending the notice comprises at least one of paging or sending an email to a service provider.

12. The method of claim 10, wherein sending the notice comprises posting the notice in a web page report, accessible to a service provider.

13. The method of claim 8, wherein the revenue discrepancy comprises at least one of a revenue leakage, a data anomaly, a system defect, or an input error.

14. The method of claim 8, wherein the executed alert rule comprises comparing raw pay per view usage data to billing and error data.

15. The method of claim 14, wherein the executed alert rule threshold comprises a difference in comparison of the raw pay per view usage data with the billing and error data of less than one percent.

16. The method of claim 8, wherein the multiple alert threshold option comprises three separate thresholds, including a high level alert threshold, a medium level alert threshold and a low level alert threshold, wherein each of the three thresholds has a different system user selectable response due to the triggered alert.

17. A computer readable medium that stores a program, executable by a computer, for reconciling revenue discrepancies relating to customer usage and billing for voice over IP services provided through a service network, the computer readable medium comprising:

a creating code segment for enabling creation of at least one alert rule and at least one corresponding alert rule threshold, by a user interactively selecting alert rule components from configuration tables stored in an alert rule component repository, the alert rule having at least two setup options including a tracking alert rule option and a trending alert rule option, and the alert rule threshold having at least three set-up options including a key-level threshold option that applies only to a specific set of key values, a default option that applies to all data, and a multiple alert threshold option;

an executing code segment for executing the at least one alert rule;

a determining code segment for determining whether the at least one threshold value has been exceeded based on application of the at least one alert rule, an alert associated with the at least one alert rule being triggered when the at least one threshold value has been exceeded; and a reporting code segment for causing a report to be generated when the alert has been triggered, indicating a possible revenue discrepancy wherein the alert is triggered based on one of four user-selectable trigger options, including (1) when a variance is within a high boundary and a low boundary of the threshold, (2) when a variance is less than or equal to a high boundary of the threshold, (3) when a variance is greater than or equal to the low boundary of the threshold, and (4) when a variance is equal to a high boundary of a threshold.

18. The computer readable medium of claim 17, wherein the tracking alert rule option includes creating a tracking alert rule that monitors end-to-end data stream accuracy across different multimedia service functions, and the trending alert rule option includes creating a trending alert rule that monitors the behavior of a specific data component with a set period of time.

* * * * *